United States Patent
Badger et al.

(10) Patent No.: US 11,519,382 B2
(45) Date of Patent: Dec. 6, 2022

(54) RELATING TO STRUCTURAL COMPONENTS FOR WIND TURBINE BLADES

(71) Applicant: Vestas Wind Systems A/S, Aarhus (DK)

(72) Inventors: Paul Badger, Salisbury (GB); Luke Spandley, Ventnor (GB)

(73) Assignee: Vestas Wind Systems A/S, Aarhus N (DK)

( * ) Notice: Subject to any disclaimer, the term of this patent is extended or adjusted under 35 U.S.C. 154(b) by 385 days.

(21) Appl. No.: 16/651,509

(22) PCT Filed: Oct. 1, 2018

(86) PCT No.: PCT/DK2018/050240
§ 371 (c)(1),
(2) Date: Mar. 27, 2020

(87) PCT Pub. No.: WO2019/068294
PCT Pub. Date: Apr. 11, 2019

(65) Prior Publication Data
US 2020/0263657 A1    Aug. 20, 2020

(30) Foreign Application Priority Data

Oct. 2, 2017 (DK) .......................... PA 2017 70743

(51) Int. Cl.
*F03D 1/06* (2006.01)
*B32B 5/02* (2006.01)
(Continued)

(52) U.S. Cl.
CPC .............. *F03D 1/0675* (2013.01); *B32B 1/00* (2013.01); *B32B 5/02* (2013.01); *B32B 5/024* (2013.01);
(Continued)

(58) Field of Classification Search
CPC .. B32B 1/00; B32B 5/02; B32B 5/022; B32B 5/024; B32B 5/026; B32B 5/06;
(Continued)

(56) References Cited

U.S. PATENT DOCUMENTS

| 2004/0058122 | A1  | 3/2004 | Tsotsis |
| 2010/0021682 | A1* | 1/2010 | Liang ................... D04H 1/4374 427/322 |

(Continued)

FOREIGN PATENT DOCUMENTS

| CA | 3011493 A1  | 8/2017 |
| CN | 101336342 A | 12/2008 |

(Continued)

OTHER PUBLICATIONS

Danish Patent and Trademark Office, Search and Examination Report in PA 2017 70743, dated Mar. 16, 2018.

(Continued)

*Primary Examiner* — Walter Aughenbaugh
(74) *Attorney, Agent, or Firm* — Wood Herron & Evans LLP (57) ABSTRACT

A wind turbine blade (2) comprising an outer shell (6) incorporating a metallic foil component (20), a conductive blade component (12) in-board of the metallic foil component (20), and a fabric sheet assembly (22) positioned between the metallic component (20) and the conductive blade component (12). The fabric sheet assembly comprises: one or more non-conductive fabric sheets (28, 30) which define first and second outer surfaces (24, 26) of the fabric sheet assembly (22); and at least one conductive thread stitch (34) penetrating a depth of the one or more fabric sheets (28, 30) and being exposed at the outer surfaces (24,

(Continued)

26); thereby to enable equipotential bonding between the conductive blade component (12) and the metallic foil component (20).

17 Claims, 3 Drawing Sheets

(51) Int. Cl.
| | |
|---|---|
| *B32B 7/09* | (2019.01) |
| *B32B 1/00* | (2006.01) |
| *B32B 5/06* | (2006.01) |
| *B32B 15/04* | (2006.01) |
| *B32B 15/14* | (2006.01) |
| *B32B 27/12* | (2006.01) |
| *B32B 27/18* | (2006.01) |
| *B32B 37/00* | (2006.01) |
| *F03D 3/06* | (2006.01) |

(52) U.S. Cl.
CPC ............... *B32B 5/06* (2013.01); *B32B 7/09* (2019.01); *B32B 15/04* (2013.01); *B32B 15/14* (2013.01); *B32B 27/12* (2013.01); *B32B 27/18* (2013.01); *B32B 37/0046* (2013.01); *F03D 3/062* (2013.01); *B32B 2603/00* (2013.01)

(58) Field of Classification Search
CPC ........... B32B 5/073; B32B 7/09; B32B 27/18; B32B 2603/00; F03D 1/065; F03D 1/0675; F03D 1/0683; F03D 3/06; F03D 3/061; F03D 3/062
See application file for complete search history.

(56) References Cited

U.S. PATENT DOCUMENTS

| | | | |
|---|---|---|---|
| 2013/0164133 A1* | 6/2013 | Grove-Nielsen | ......... B32B 5/08 219/548 |
| 2013/0216767 A1 | 8/2013 | Cinquin | |
| 2017/0246833 A1 | 8/2017 | Crespo Pena et al. | |

FOREIGN PATENT DOCUMENTS

| | | |
|---|---|---|
| EP | 1520983 A1 | 4/2005 |
| EP | 3020958 A1 | 5/2016 |
| GB | 2497578 A | 6/2013 |
| WO | 2006082479 A1 | 8/2006 |
| WO | 2015055215 A1 | 4/2015 |

OTHER PUBLICATIONS

European Patent Office, International Search Report and Written Opinion in PCT Application No. PCT/DK2018/050240, dated Jan. 4, 2019.

China National Intellectual Property Adminstration, First Notification of Office Action in CN Application No. 201880072873.X, dated Jun. 24, 2021.

* cited by examiner

RELATING TO STRUCTURAL COMPONENTS FOR WIND TURBINE BLADES

TECHNICAL FIELD

Aspects of the present invention relate to structural components for wind turbine blades, and more particularly to systems and methods for improving connection between structural components of the wind turbine blade and a lighting protection system installed in the wind turbine.

BACKGROUND

Wind turbine blades are susceptible to being struck by lightning, as wind turbines are typically located in wide open spaces. A lightning strike event, and the accompanying massive build-up and transfer of electric charges that occur as a result, has the potential to cause serious physical damage to the turbine blades, as well as electrical damage to the internal control electronics of the wind turbine. Such damage can result in wind turbine downtime so that appropriate repairs can be carried out.

Much effort has therefore been invested in designing wind turbines, and particularly wind turbine blades, such that they are able to handle the electric discharges caused by the lighting strikes.

In general, Lightning Protection Systems (LPS) for wind turbines are known technology. In one example, the wind turbine blades are equipped with a series of electrically conductive elements that are embedded in an outer surface of the wind turbine blade. These conductive elements are connected within the blade shell to a cable, also referred to as a 'down conductor', that extends from the blade tip to its root. With such a system installed, the lightning and the electric charges generated are more likely to attach to these conductive elements than to the less-conductive material that forms the majority of the wind turbine blade outer surface. The electric charges are thereafter transmitted via the down conductor to the wind turbine main structure, where they are grounded.

Some turbine blades incorporate a conductive layer of material, for example a metallic foil component, (also sometimes referred to as a Surface Protection Layer or SPL) which is provided over or just below the outer surface of the blade, and helps to increase the area of the blade that can handle or receive lightning strikes safely.

Good electrical connection between the receptor elements, the SPL, and conductive elements that are present within the internal structure of the turbine blade is important as it helps to prevent build-up of charges in those components, thereby guarding against electrical arcing between those components. However, such good electrical connections can be difficult to achieve due to the number of different components present within the layered structure of the turbine blade.

It is against this background that the embodiments of the invention have been devised.

SUMMARY OF THE INVENTION

According to an aspect of the present invention there is provided a wind turbine blade comprising an outer shell incorporating a metallic foil component, a conductive blade component in-board of the metallic foil component, and a fabric sheet assembly positioned between the metallic component and a conductive blade component. The fabric sheet assembly comprises: one or more non-conductive fabric sheets which define first and second outer surfaces of the fabric sheet assembly; and at least one conductive thread stitch penetrating a depth of the one or more fabric sheets and being exposed at the outer surfaces; thereby to enable equipotential bonding between the conductive blade component and the metallic foil component.

Specifically, the conductive thread stitch is electrically conductive, whilst the fabric sheets are relatively much less electrically-conductive. This enables electrical charge to be conducted between the metallic foil component and the conductive blade component through the fabric sheet assembly, and specifically via the conductive thread stitch or stitches. This advantageously ensures that there is no build-up of charge in, or a large voltage difference between, any of the components during a lightning strike; it also prevents arcing between the internal conductive blade components and the metallic foil component (part of the LPS) which might damage the blade. The incorporation of the conductive element in the form of a stitch also minimises the amount of conductive material that is required.

Optionally, the at least one conductive thread stitch is arranged to contact the conductive blade component at the first outer surface, and to contact the metallic foil component at the second outer surface. Additionally or alternatively, the conductive blade component may comprise a conductive spar cap.

Advantageously, the above-described positioning of the conductive fabric sheet assembly and its constituent components ensures good electrical connection between the internal components of the wind turbine blade, and specifically between the structural, conductive carbon spar cap, and the metallic foil component which forms part of the LPS. It will also be appreciated that the conductive assembly may contact or be connected to the down conductor within the blade shell instead of (or in addition to) contacting the spar cap or the metallic foil component.

Each of the fabric sheets may comprise at least one of: a woven fabric sheet or a non-woven fabric sheet. In some instances, each of the fabric sheets may comprise unidirectional fibres, biaxially-oriented woven fibres, or triaxially-oriented woven fibres. Additionally or alternatively, the non-woven fabric sheet may comprise randomly-oriented fibres.

Various different types of materials may be utilised to form the fabric sheets in the conductive assembly, and these materials may take the form of woven or non-woven fabric, although non-woven fabric may be preferable in some cases because the fibres do not have undulations where they are woven. In addition, the fibres in these sheets may be oriented in specific directions (for example, uni-directional, bidirectional, or in three directions), or instead be randomly-oriented.

Optionally, the fabric sheet assembly comprises a plurality of non-conductive fabric sheets. Advantageously, using multiple layers of fabric material, and in particular, layers of material that correspond to the layers used in the blade layup at other locations along the blade length away from the spar caps, allows the fabric sheet assembly to also contribute to structural support of the blade, as well as providing electrical connection between blade components.

In some instances, the at least one conductive thread stitch may comprise a metallic thread. For example, the metallic thread may be formed of steel or copper, both of which are good electrical conductors and may be easily manufactured in the form of stitchable thread.

In other instances, the at least one conductive thread stitch comprises a non-metallic thread. For example, the non-metallic thread may comprise a carbon fibre thread.

It will be appreciated that a large range of conductive materials may be used in this instance, as long as a thread of some description may be produced from them and stitched through the fabric sheet layer(s); and as long as the material forming the thread is relatively more conductive than the layer through which it is to be stitched.

Optionally, the at least one conductive thread stitch comprises a plurality of stitches arranged in a rectilinear pattern. Additionally or alternatively, the conductive thread stitch may include discrete groups comprising a plurality of stitches, for example, to define at least one stitch-ring.

Varied patterns of stitching can be used, and the above examples merely provide some possibilities that are envisioned. It will be appreciated that the specific stitch spacing, numbers and patterns used will depend on the material of the thread and the amount of charge that can be conducted through a particular stitch. Other possible stitch patterns involve regularly spaced stitches; a series of sets of circles/rings of stitches along the length of the blade, each set separated by a certain distance; or a zig-zag design of stitches along length of the blade.

According to another aspect of the present invention, there is provided a fabric sheet assembly for a structural FRP (Fibre Reinforced Plastic) component of a wind turbine blade. The fabric sheet assembly comprises: one or more non-conductive fabric sheets which define first and second outer surfaces of the fabric sheet assembly; and at least one conductive thread stitch penetrating a depth of the one or more fabric sheets and being exposed at each one of the outer surfaces, thereby to permit electrical conduction between those outer surfaces.

The conductive fabric sheet assembly may be provided in the form of a pre-fabricated kit that can be easily inserted into the structural components of the wind turbine blade during its manufacture, so as to provide an equipotential bonding between the internal structural components of the wind turbine blade and the LPS. Advantageously, the above configuration also ensures that the amount of conductive material that is required to achieve the equipotential bonding is minimised.

According to a further aspect of the present invention, there is provided a method of assembling a wind turbine blade in a blade mould. The method comprises: laying a metallic foil component in the blade mould; providing a fabric sheet assembly on the metallic foil component; and laying a conductive blade component in the blade mould so that it overlays at least a portion of the fabric sheet assembly. The fabric sheet assembly comprises: one or more non-conductive fabric sheets which define first and second outer surfaces; and at least one conductive thread stitch penetrating a depth of the one or more fabric sheets and being exposed at the outer surfaces thereby to permit equipotential bonding between the conductive blade component and the metallic foil component via the fabric sheet assembly.

Specifically, the thread stitch is electrically conductive so as to allow electrical conductivity between the metallic foil component of the LPS, and the conductive structural carbon spar caps. The fabric sheet assembly is integrated directly into the layered structure that is used to construct the hollow turbine blade shell. This integration of the conductive elements into the composite layered structure of the blade ensures that there are minimal weak points along the turbine blade, which points would be subject to stresses during operation of the wind turbine. Advantageously, the above-described method also simplifies the manufacture of the blade structure, as the pre-fabricated kit is simply laid in place where it is required. Alternatively, the fabric sheet assembly may be constructed in the blade mould, in which case the fabric sheets would be laid in the desired positions in the mould, and the stitching of the conductive thread through the fabric sheets would take place in situ.

Optionally, the at least one conductive thread stitch may be arranged to contact the conductive blade component at the first outer surface, and to contact the metallic foil component at the second outer surface. Advantageously, such a configuration ensures that the electrically conductive fabric sheet assembly is in contact with the conductive blade component and a component of the wind turbine LPS thereby allowing equipotential bonding between the two components.

The method may further comprise laying at least one non-conductive FRP structural layer in the blade mould so as to at least partially overlap the FRP structural layer with the fabric sheet assembly.

Advantageously, the above configuration his increases the integrity of the blade structure, avoiding weak spots in the blade along the joining lines of the pre-fabricated fabric sheet assembly and the rest of the structural fabric layers in the blade.

According to another aspect of the present invention, there is provided a method of making a fabric sheet assembly for a structural component of a wind turbine blade. The method comprises: providing one or more non-conductive fabric sheets defining first and second outer surfaces; and inserting at least one conductive thread stitch into the one or more non-conductive fabric sheets, the at least one conductive thread stitch penetrating a depth of the one or more fabric sheets and being exposed at the outer surfaces, thereby to permit electrical conduction between the first and second outer surfaces.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In order to place the invention in context, it is important first to understand the integral components of a wind turbine blade, and the method that is used to manufacture the blade.

A modern utility-scale wind turbine blade is typically formed from a two-part hollow shell. The blade is stiffened to prevent it from bending excessively and, usually, each shell incorporates one or more relatively stiff strips or 'spars' that run along the length of the blade. To provide the blade with the necessary strength to withstand the forces acting on it during operation, the opposing spars are interconnected by a construction called a shear web. There are two main approaches to achieving this design, and one of these approaches is shown in FIG. 1.

Figure 1:
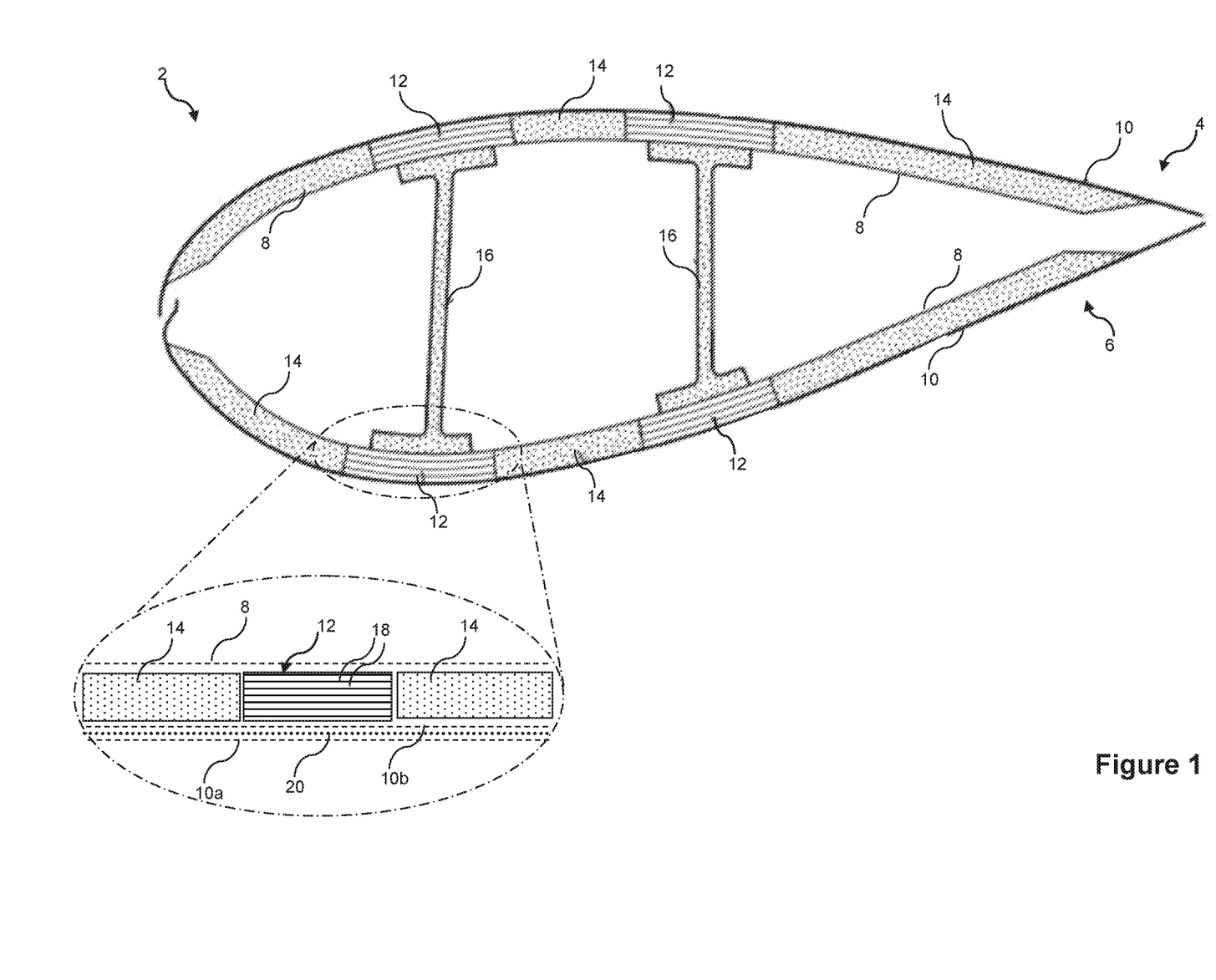
FIG. 1 is a schematic diagram of a vertical cross-section of a wind turbine blade in which an embodiment of the present invention may be implemented.

FIG. 1 shows a vertical cross-section of the spanwise length of a wind turbine blade 2 (i.e. the width of the blade), in which the blade 2 has a hollow shell structure comprising an upper half shell 4 and a lower half shell 6 that are united to form the complete shell having an aerofoil cross section. Each half shell is a composite structure comprising inner and outer laminate layers or 'skins' 8, 10 of material, for example fibre reinforced plastic (FRP).

The upper and lower half shells 4,6 each includes a strengthening structure comprising two spar caps 12, each of which runs along the spanwise length of the blade 2. The spar caps 12 may also be known by other terminology in the art such as 'spars', 'beams' or 'girders'. The number of spar caps 12 within a blade may vary, and they may be located at intervals along the chordwise length of the blade. It is preferable for the spar caps 12 to be extremely stiff and lightweight and for this reason they may be fabricated from carbon fibre reinforced plastic (CFRP) material. Carbon fibre is not essential, however, but it is generally preferred due to its very high strength to weight ratio. In this blade 2, the spar caps 12 are embedded in the laminated FRP layers and so form an integral part of the shells 4, 6. Such a blade design is sometimes referred to as a 'structural shell'. Certain regions of the blade incorporate lightweight cores 14 such as structural foam or balsa wood that are sandwiched between the outer and inner skins 8, 10 and located in between the spars 12. Such a sandwich panel construction improves bending stiffness and reduces the risk of buckling in these regions. Similar blade structures are also known having a single spar cap.

Referring more specifically to the spar caps 12, each of these has a substantially rectangular cross section and is made up of a stack of pre-fabricated elongate reinforcing planks or strips 18. The strips 18 are pultruded members of carbon-fibre reinforced plastic, and are substantially flat and of rectangular cross section. The number of strips 18 in the stack depends upon the thickness of the strips 18 and the required thickness of the shells 4,6, but typically the strips 18 each have a thickness of a few millimetres and there may be between two and twelve strips in the stack. The strips 18 have a high tensile strength, and thus have a high load bearing capacity. In other examples, the spar caps 12 may be formed from carbon fibre in the form of dry fabric material that is subsequently infused with resin, or the spar caps 12 may be formed from CFRP pre-preg material (i.e. carbon fibre material which has been pre-impregnated with resin).

Manufacture of the blade using a resin-infusion process will now be described, by way of example, in which components of the blade are laid up in a blade mould and subsequently infused with resin. Firstly one or more layers of dry glass-fibre fabric are arranged in the mould to form the outer skin of the blade. Then, panels of structural foam (or alternatively other materials such as balsa wood) are arranged on top of the glass-fibre layer to form the sandwich panel cores 14 referred to in FIG. 1. The foam panels are spaced apart relative to one another to define a pair of channels in between them for receiving respective spar caps. To assemble the spar caps, a plurality of pultruded strips of CFRP, as described above with reference to FIG. 1, are stacked in the respective channels. It is also possible to lay pre-assembled stacks into the channels.

Once the spar caps are in place, more dry glass-fibre fabric layers are arranged on top of the foam panels and the spar caps. This forms the inner skin of the blade. Next, vacuum bagging film is placed over the mould to cover the layup. Sealing tape is used to seal the vacuum bagging film to a flange of the mould and a vacuum pump is used to withdraw air from the interior volume between the mould and the vacuum bagging film. Once a suitable partial vacuum has been established, resin is introduced to the sealed volume at one or more insertion points. The resin infuses between the various laminate layers and fills any gaps in the laminate layup. Once sufficient resin has been supplied to the mould, the mould is heated whilst the vacuum is maintained to cure the resin and bond the various layers together to form the half shell of the blade. The other half shell is made according to an identical process.

It is worth mentioning here that the resin-infusion process described above is one example of a blade fabrication process. Another example is a so-called 'pre-preg' process where the glass fibre components of the blade have been pre-impregnated with resin. In such a case a complete resin infusion process is not necessary as the assembled layers of the blade can simply be heated which triggers the curing process of the resin in the glass-fibre fabric.

In either fabrication process, once both shells are cured and the vacuum bagging consumables removed (if applicable) the shells 4, 6 are ready to be joined. Adhesive is applied to the leading and trailing edges of the shells 4, 6, as well as at the locations where strengthening web structures 16 will be arranged. The web structures 16 are then loaded and more adhesive is applied to their upper surfaces. The shells 4, 6 are then brought together to form the completed blade 2. Subsequent finishing processes can be started once the adhesive is cured.

Other examples of rotor blades having spar caps integral with the shell are described in EP1520983, WO2006/082479 and UK Patent Application GB2497578.

The inset panel to FIG. 1 shows an enlarged view of one of the spar caps 12 in a finished wind turbine blade 2, where the spar cap 12 is located in a channel between a pair of foam panels 14. The inner 8 and outer skins 10 are also shown above and below the foam panel cores 14 and spar cap 12 for context.

As previously mentioned, it is important to install a lightning protection system (LPS) within the wind turbine blade, so as to allow the blades to handle the electric discharges caused by the lighting strikes. Two main approaches for an LPS design were described in the background section, namely the provision of conductive elements that are embedded in an outer surface of the wind turbine blade, and the inclusion of a metallic foil component (or SPL) which may take the form of a metallic mesh, net, or an expanded metal foil is provided over or just below the outer surface of the blade. Examples of an LPS are described in WO 2015/055215. In practice, the LPS design may involve a combination of these two design elements. In the context of the blade manufacture method described previously, the conductive element and the metallic foil component may be incorporated into the blade shell during the initial part of the blade layup process in which one or more glass-fibre fabric layers are layered in the mould to form the blade outer skin 10. Connections to a down conductor (not shown) within the blade shell may be made subsequently at some point during blade layup, or after the blade layup is complete.

As the outer blade skin generally comprises multiple layers of material, the metallic foil component will usually be separated from the spar caps and foam panels by one or more non-conductive layers of material. This is because it is desirable to locate the conductive elements and metallic foil component on the outer surface of the blade, or as close to the blade outer surface as possible, so as to ensure that the lightning strike charges can be easily conducted by these components. This configuration is illustrated in the FIG. 1 inset panel, in which a metallic foil component 20 is located between two layers of glass-fibre fabric (or other material) 10a, 10b which form the outer skin 10 of the blade. For example, the metallic foil component 20 may be located between a layer of glass-fibre fabric and an outer gel-coat layer of the blade.

The spar caps 12 are predominantly made of carbon fibre material, which is electrically conductive. There is therefore a risk of electrical charge build-up within the spar caps 12, which could result in arcs between the spar caps and components of the LPS (or other conductive components within the blade shell), which could damage the blade. It will therefore be appreciated that there is a need to ensure good electrical connection between the metallic foil component 20 and/or conductive elements which form part of the LPS, and the spar caps 12.

Figure 2:
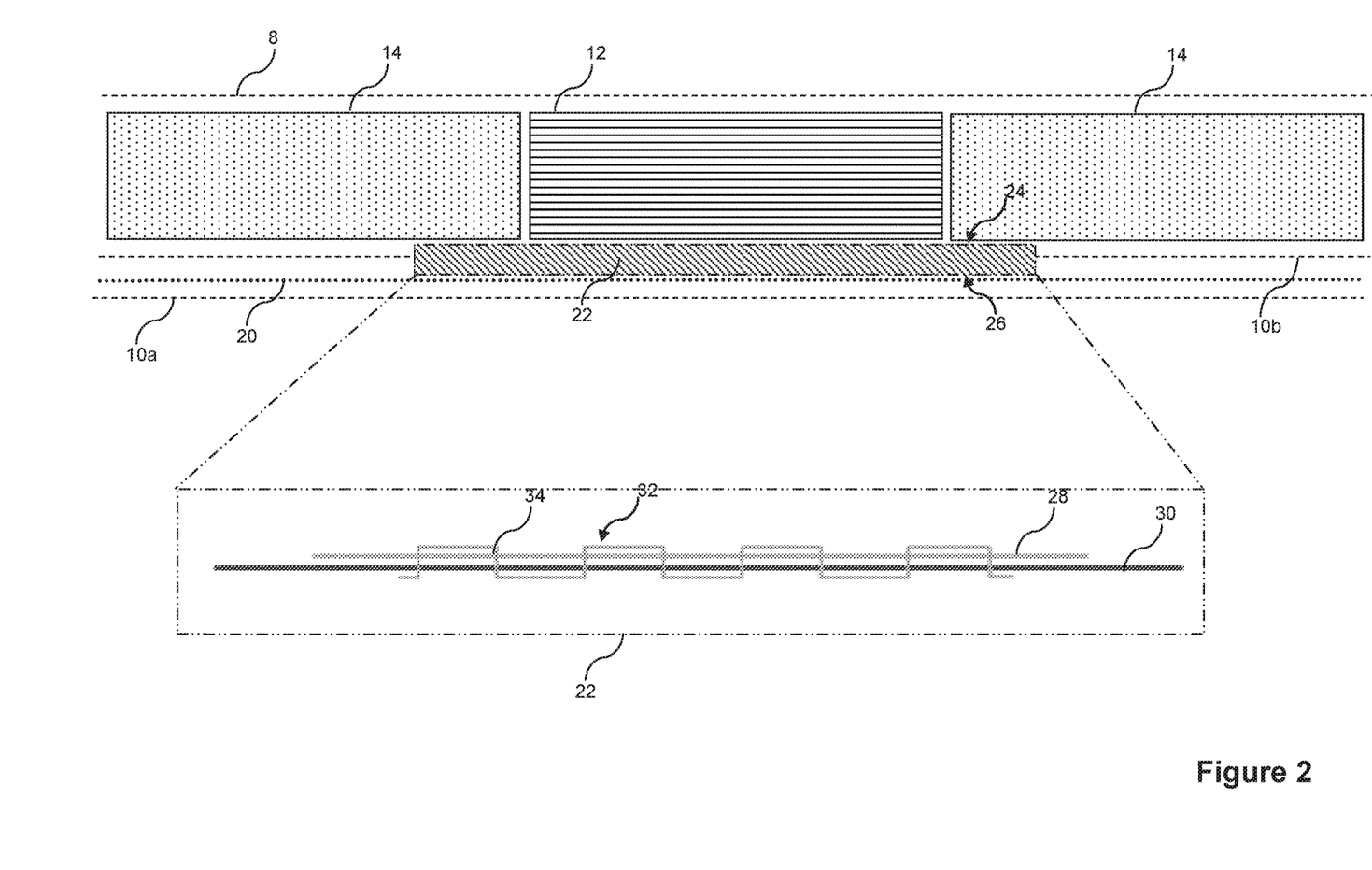
FIG. 2 shows an enlarged view of a portion of the layered structure of the wind turbine blade around a spar cap, incorporating a conductive assembly according to an aspect of the present invention, where a specific embodiment of the conductive assembly is shown in an inset panel.

FIG. 2 therefore shows an enlarged, more detailed version of part of the internal structure of the blade shell (previously shown in the inset panel of FIG. 1) in which an embodiment of the present invention is implemented so as to improve the electrical conduction between the spar cap 12 and the metallic foil component 20 of the LPS.

The general concept of the invention involves the incorporation of a conductive element into the blade shell (during the layup process) so as to provide good electrical connection between the spar cap 12 and the LPS component 20. Specifically, in the illustrated embodiment in which the LPS component in question is the metallic foil component 20, a conductive assembly 22 is located within the layers of the outer blade skin so as to contact the spar cap 12 at an upper surface 24 of the conductive assembly 22, and to contact the metallic foil component 20 at a lower surface 26 of the conductive assembly 22.

By electrically connecting the spar cap 12 and the metallic foil component 20, the conductive assembly 22 is able to ensure equipotential bonding between the two components. This prevents a large voltage difference forming between them, and avoids the occurrence of arcs between these components, which might otherwise damage the blade. Advantageously, the incorporation of a conductive element in this manner maintains the ease of blade manufacture, as the conductive element merely needs to be incorporated into the outer blade skin 10 during the layup process.

The inset panel of FIG. 2 shows a specific configuration of a conductive assembly.

The conductive assembly 22 of this embodiment takes the form of a conductive fabric sheet assembly 22 that comprises one or more layers 28, 30 of non-electrically conductive fabric sheet material, and contains an electrically conductive element 32 integrated within it. The electrically conductive element 32 is exposed at the outer faces of the fabric sheet assembly, and specifically at upper 24 and lower 26 faces of the fabric sheet assembly. This allows for good electrical conduction through the fabric sheet assembly 22. When positioned and oriented as shown in FIG. 2, the fabric sheet assembly 22 allows charge transport between the spar cap 12 and the metallic foil component 20. Any charge build-up in the carbon spar caps 12 may thereby be dissipated to the metallic foil component 20 via the fabric sheet assembly 22 and hence removed by the LPS.

The fabric sheet assembly 22 comprises at least one layer of glass-fibre fabric 28, 30, similar to those layers of glass-fibre fabric that are used to construct the main blade shell structure 4, 6. This is advantageous as the fabric sheet assembly 22 can be easily incorporated into the blade shell 4, 6 during the initial layup process. As the material is similar to that which would be incorporated into the blade shell and has similar structural properties, the conductive assembly 22 may provide dual functionality—electrical connectivity as well as structural support. In other words, the conductive assembly 22 may replace a portion of the outer blade skin 10 and form part of the integral structure of the wind turbine blade 2.

In the illustrated embodiment, the fabric sheet assembly 22 comprises two sheets of glass-fibre fabric: one of the layers 28 is composed of tri-axially oriented glass fibres (and may therefore also sometimes be referred to as a 'triax'); the other layer 30 comprises randomly-oriented glass fibres (and is sometimes referred to as a 'needlemat'). These sheets of glass-fibre fabric contribute to the structural functionality of the conductive assembly 22.

The conductive element 32 in this embodiment takes the form of thread that is formed of electrically conductive material, and which is stitched through the layers of glass-fibre fabric 28, 30, so that the stitches 34 penetrate the depth of the fabric sheets 28, 30 in the assembly. Portions of the stitches 34 are therefore exposed at the upper 24 and lower 26 surfaces of the fabric sheet assembly 22 so that charge is conducted through the fabric sheet assembly 22 via the stitches 34. The provision of the conductive element in the form of conductive thread stitches serves to minimise the amount of conductive material that is required, whilst also allowing for good electrical connection through the fabric sheet assembly 22. It will be appreciated that the total number of stitches, as well as the stitch density, may vary in different embodiments, as the amount of stitching that is required will be dependent upon the conductivity of the stitch material, and therefore how much current each stitch can carry. Similarly, the gauge of wire/thread that is used for the stitching may be selected based on the predicted current that the stitching is required to bear.

It will be appreciated that the fabric sheet assembly 22 may comprise multiple triax or needlemat layers, or that these layers may be replaced by other types of material. For example, material composed of unidirectionally-oriented fibres, or biaxially-oriented fibres may be utilised instead. Additionally or alternatively, these layers may involve the glass fibres being either woven, or non-woven. In particular, the non-woven fibres (which could be formed from layers of fibres being simply stacked up and then stitched together) may even be preferable in some cases to woven fabric as the latter may have undulations in the fibre where they are woven. As a general comment, it should be noted that the exact form of the fibre alignment is not crucial. However, the fibre alignment of the fabric sheets may be selected to complement the fibre alignment of the glass-fibre layers (or 'plies') used in the rest of the blade structure for consistency of structural characteristics/attributes across the entirety of the blade shell.

Moreover, the form of conductive thread stitch 34 that is shown in the figures is only one of many possible variants. To begin with, a large range of conductive materials may be utilised as the conductive thread material, and these may be metallic (for example, steel or copper thread), or non-metallic (for example, carbon fibre thread). As long as the material in question may be converted into a thread-like form that is stitchable, and that is relatively more electrically-conductive than the layers of (glass fibre) fabric material 28, 30 through which the thread is stitched, the exact material used for the conductive element is not important.

Furthermore, the stitch pattern that is used may vary in different embodiments depending on the amount of coverage required, or the conductivity of each stitch. For example, and purely by way of illustration, the stitch pattern may comprise a series of stitches (or stitch sets) provided at intervals along the spanwise blade length—a 1 cm stitch set may be provided every 1 m or so along the blade. The stitches may also be arranged in patterns such as a rectilinear pattern, a 'zig-zag' pattern, or as a group of stitches, for example as a ring of stitches. This latter pattern would therefore manifest as small stitch rings every 1 m or so along the blade in the above example. As long as the necessary electrical conduction is provided, the exact form of the stitches and their precise locations are immaterial, as the quantity and pattern of the stitching is dependent on the level of through thickness conductivity required.

Turning now to possible methods of manufacturing such a conductive assembly 22 and incorporating it into a wind turbine blade 2, it will be appreciated that many of the constituent components of the conductive assembly 22 may be purchased off-the-shelf. For example, the various layers 28, 30 of glass fibre material may be manufactured and supplied separately, and the conductive thread stitching 32 is applied at a later time. Considering the structure of the fabric sheet assembly 22, it will be appreciated that one method of manufacture may involve cutting sheets of fabric material to a desired size, stacking them as required and stitching through the fabric layers with the conductive thread using, for example, an industrial stitching machine. It will be appreciated that in this case, the form of the stitches 34 may depend on the capabilities of the stitching machine.

The conductive assembly 22 therefore may take the form of a pre-fabricated kit that can be incorporated into the blade 2 during its assembly, as will now be described with respect to FIG. 3, which shows three main phases of the blade layup process involving the laying of various blade components in a mould.

In an initial phase, one or more outer skin layers 10 of blade shell material are laid in the mould. In the illustrated embodiment, a first outer layer 10a of glass-fibre material is laid in the mould followed by an LPS layer comprising the metallic foil component 20, although it will be appreciated that the outermost layer of glass-fibre fabric material may be omitted in some cases. The conductive assembly 22 (in the form of a pre-fabricated kit) is then laid on top of the metallic foil component 20. It will be appreciated, however, that it would also be possible to construct the fabric assembly 22 during blade layup, in which case the layers 28, 30 of fabric material that form the conductive assembly would be laid in the desired location in the blade mould, and the stitches 34 would then be inserted in situ.

In the next phase, additional structural layers 10b, 10c of the blade shell are laid into the blade mould adjacent to the conductive assembly 22, and also partially overlapping the conductive assembly 22, to ensure that the conductive assembly 22 is incorporated into the blade shell 6 as seamlessly as possible. This helps to avoid weak points forming in the blade shell along joining lines between the conductive assembly 22 and the corresponding adjacent structural fabric layers 10b, 10c. It will be noted in the illustrated embodiment that the number of layers 28, 30 and type of material used in each layer of the conductive assembly 22 mirrors the structural layers 10b, 10c that are subsequently laid in the blade mould. The conductive assembly therefore forms an integral part of the blade shell structure, and effectively replaces the portion of the structural blade skin 10 adjacent the spar caps 12.

Subsequently, the carbon spar cap 12 and its adjacent foam panels 14 are laid in the blade mould on top of the other components, with the placement of the carbon spar cap 12 corresponding to that of the conductive assembly 22. This means that the spar cap 12 is brought into (direct) contact with portions of the conductive thread stitches 34 that are exposed at the upper surface 24 of the conductive assembly 22; electrical connection is thereby achieved. One or more structural fabric layers 8 are then laid in the mould, over the spar cap and foam panels, to form the inner blade skin.

Figure 3:
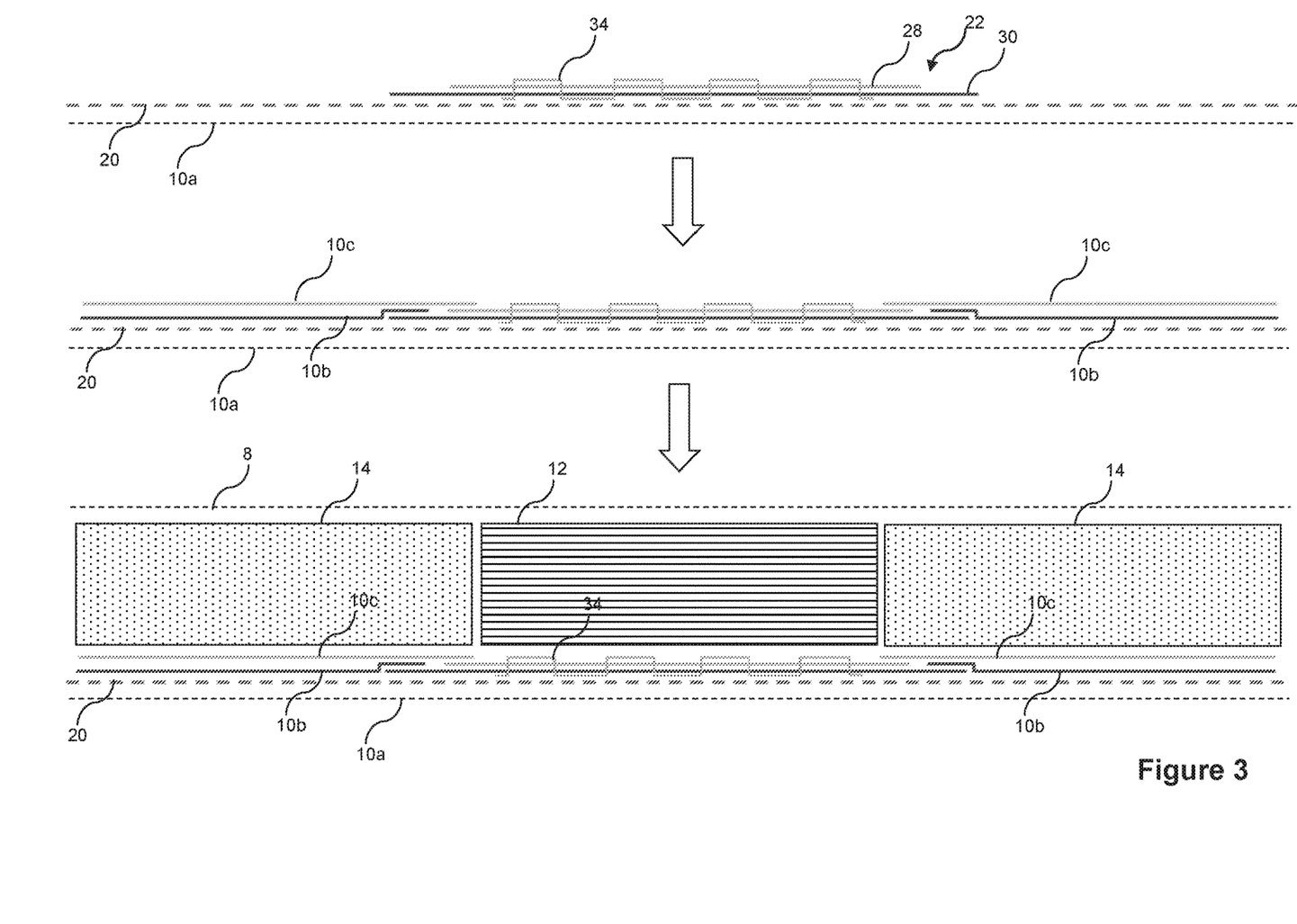
FIG. 3 shows schematically the steps involved in a method of producing the layered blade structure that is shown in FIG. 2.

It will be appreciated that the width/extent of the conductive assembly 22, as seen in the vertical cross-section of the blade in FIG. 3, is overall slightly greater than that of the carbon spar cap 12. This is advantageous as it ensures that the full extent of the carbon spar cap 12 is in contact with the conductive assembly 22. In addition, the greater the width of the conductive assembly 22, the less current will need to pass through each stitch 34 or connection point, as there will be a greater number of connection points in total. However, it will be appreciated that the conductive assembly 22 may also be narrower than the width of the carbon spar cap 12, and that it may in fact be advantageous to have a narrower conductive assembly 22 as to do so would likely increase the structural integrity of the blade 2.

Furthermore, the conductive fabric sheet assembly 22 could take the form of a continuous piece of material that runs along the length of the blade. Alternatively, the conductive assembly may merely involve short sections, or even discrete pieces provided at predetermined intervals or specific locations. In addition, it is envisaged that an alternative embodiment may involve the provision of a wide glass-fibre sheet that extends along a length of the blade so as to cover the spar cap 12, as well as its adjacent structural foam panels 14. The conductive thread stitches 34 are provided in the portion of this glass-fibre sheet that corresponds to the location of the spar cap, so as to facilitate electrical connection with the carbon spar cap via the stitches. Such an embodiment would also have the advantage of improving the structural integrity of the overall blade structure.

The present invention therefore provides a conductive fabric sheet assembly 22 for a wind turbine blade 2 that minimises the amount of conductive material that is required to be used, whilst ensuring that there is no build-up of charge in the spar cap 12, and the spar cap 12 and metallic foil component 20 are equipotentially bonded with one another. Providing the conductive assembly 22 in the form of a prefabricated kit increases the ease with which the conductive assembly 22 may be integrated into the wind turbine blade 2, and simplifies the overall blade manufacture process.

Many modifications may be made to the above examples without departing from the scope of the present invention as defined in the accompanying claims.

For example, it will be appreciated that the conductive assembly 22 may also be used to achieve electrical connection and equipotential bonding between other elements that are integral to the wind turbine blade. In particular, the carbon spar cap 12 could be electrically connected to the down conductor (located within the blade shell, not shown) via the conductive fabric sheet assembly 22. This would involve at least a portion of the conductive assembly 22 being located on top of the carbon spar cap 12 so as to allow the conductive thread stitches 34 to contact the down conductor (which would be located in-board of the spar cap 12). The change in location of the conductive assembly would also, by extension, alter the manufacturing process, as the conductive assembly 22 would instead need to be laid in the mould after the spar cap 12 and foam panels 14.

The invention claimed is:

1. A wind turbine blade comprising an outer shell incorporating a metallic foil component, a conductive blade component in-board of the metallic foil component, and a fabric sheet assembly positioned between the metallic foil component and the conductive blade component, the fabric sheet assembly comprising:
  one or more non-conductive fabric sheets which define first and second outer surfaces of the fabric sheet assembly; and
  at least one conductive thread stitch penetrating a depth of the one or more fabric sheets and being exposed at the outer surfaces; thereby to enable equipotential bonding between the conductive blade component and the metallic foil component.

2. The wind turbine blade of claim 1, wherein the at least one conductive thread stitch is arranged to contact the conductive blade component at the first outer surface, and to contact the metallic foil component at the second outer surface.

3. The wind turbine blade of claim 1, wherein the conductive blade component comprises a conductive spar cap.

4. The wind turbine blade of claim 1, wherein each of the fabric sheets comprises at least one of: a woven fabric sheet or a non-woven fabric sheet.

5. The wind turbine blade of claim 1, wherein each of the fabric sheets comprises unidirectional fibres, biaxially-oriented woven fibres, or triaxially-oriented woven fibres.

6. The wind turbine blade of claim 4, wherein the non-woven fabric sheet comprises randomly-oriented fibres.

7. The wind turbine blade of claim 1, wherein the fabric sheet assembly comprises a plurality of non-conductive fabric sheets.

8. The wind turbine blade of claim 1, wherein the at least one conductive thread stitch comprises a metallic thread.

9. The wind turbine blade of claim 1, wherein the at least one conductive thread stitch comprises a non-metallic thread.

10. The wind turbine blade of claim 9, wherein the non-metallic thread comprises a carbon fibre thread.

11. The wind turbine blade of claim 1, wherein the at least one conductive thread stitch comprises a plurality of stitches arranged in a rectilinear pattern.

12. The wind turbine blade of claim 1, wherein the at least one conductive thread stitch includes discrete groups comprising a plurality of stitches.

13. The wind turbine blade of claim 12, wherein the discrete groups of stiches define at least one stitch-ring.

14. A method of assembling a wind turbine blade in a blade mould, the method comprising:
  laying a metallic foil component in the blade mould;
  providing a fabric sheet assembly on the metallic foil component;
  laying a conductive blade component in the blade mould so that it overlays at least a portion of the fabric sheet assembly,
  wherein the fabric sheet assembly comprises:
    one or more non-conductive fabric sheets which define first and second outer surfaces; and
    at least one conductive thread stitch penetrating a depth of the one or more fabric sheets and being exposed at the outer surfaces thereby to permit equipotential bonding between the conductive blade component and the metallic foil component via the fabric sheet assembly.

15. The method of claim 14, wherein the at least one conductive thread stitch is arranged to contact the conductive blade component at the first outer surface, and to contact the metallic foil component at the second outer surface.

16. The method of claim 14, further comprising laying at least one non-conductive fibre reinforced plastic structural layer in the blade mould so as to at least partially overlap the fibre reinforced plastic structural layer with the fabric sheet assembly.

17. A method of making a fabric sheet assembly for a structural component of a wind turbine blade, the method comprising:
  providing one or more non-conductive fabric sheets defining first and second outer surfaces;
  inserting at least one conductive thread stitch into the one or more non-conductive fabric sheets, the at least one conductive thread stitch penetrating a depth of the one or more fabric sheets and being exposed at the outer surfaces, thereby to permit electrical conduction between the first and second outer surfaces.

* * * * *